(12) United States Patent
Witz et al.

(10) Patent No.: US 8,439,603 B2
(45) Date of Patent: May 14, 2013

(54) IMPROVEMENTS RELATING TO HOSE (75) Inventors: Joel Aron Witz, Newdigate (GB); David Charles Cox, Thornton Heath (GB)

(73) Assignee: BHP Billiton Petroleum Pty Ltd., Melbourne, Victoria (AU)

( * ) Notice: Subject to any disclaimer, the term of this patent is extended or adjusted under 35 U.S.C. 154(b) by 440 days.

(21) Appl. No.: 12/377,261

(22) PCT Filed: Aug. 10, 2007

(86) PCT No.: PCT/GB2007/003063
§ 371 (c)(1),
(2), (4) Date: Jun. 2, 2009

(87) PCT Pub. No.: WO2008/017868
PCT Pub. Date: Feb. 14, 2008

(65) Prior Publication Data
US 2010/0183371 A1      Jul. 22, 2010

(30) Foreign Application Priority Data

Aug. 11, 2006   (GB) ................................. 0616053.5

(51) Int. Cl.
*F16L 11/12* (2006.01)
*F16L 11/112* (2006.01)
*F16L 11/118* (2006.01)

(52) U.S. Cl.
USPC ........ 405/169; 405/168.2; 138/137; 138/127; 138/129

(58) Field of Classification Search .................. 405/157, 405/168.2, 169, 170; 138/118, 118.1, 121–127, 138/129, 137
See application file for complete search history.

(56) References Cited

U.S. PATENT DOCUMENTS

| 956,076 | A | 4/1910 | Greenfield |
|---|---|---|---|
| 1,178,559 | A | 4/1916 | Vautier |
| 1,588,606 | A | 6/1926 | Oden |
| 1,599,775 | A | 9/1926 | Lamb et al. |
| 1,607,909 | A | 11/1926 | Oden |
| 1,785,345 | A | 12/1930 | Hasemann |
| 1,810,032 | A | 6/1931 | Schulthess |
| 1,901,330 | A | 3/1933 | Poberejsky |
| 1,911,486 | A | 5/1933 | Bacheldor et al. |
| 2,011,781 | A | 8/1935 | Tabozzi |

(Continued)

FOREIGN PATENT DOCUMENTS

| CN | 1441884 | 9/2003 |
|---|---|---|
| CN | 1732352 | 2/2006 |

(Continued)

OTHER PUBLICATIONS

International Preliminary Report on Patentability and Written Opinion, PCT/GB2007/003063 mailed Feb. 26, 2009.

(Continued)

*Primary Examiner* — Tara M. Pinnock (57) ABSTRACT

A hose comprising an inner tubular structure, an outer tube and an insulation layer, wherein the inner tubular structure comprises a tubular body disposed between inner and outer gripping members, the tubular body including a sealing layer, and being formed of a material capable of withstanding cryogenic temperatures, wherein the outer tube comprises a rubber layer and a reinforcing layer disposed around the rubber layer, wherein the insulation layer is either incorporated in the inner tubular structure and/or is disposed between the inner tubular structure and the outer tube.

55 Claims, 4 Drawing Sheets

U.S. PATENT DOCUMENTS

| | | | |
|---|---|---|---|
| 2,184,984 | A | 12/1939 | Van Stone et al. |
| 2,371,363 | A | 3/1945 | Smith |
| 2,610,869 | A | 9/1952 | Percy |
| 2,661,026 | A | 12/1953 | Schulthess |
| 2,706,494 | A | 4/1955 | Morse |
| 2,825,364 | A | 3/1958 | Cullen et al. |
| 2,829,671 | A | 4/1958 | Ernst et al. |
| 2,858,147 | A | 10/1958 | Guarnaschelli |
| 2,940,778 | A | 6/1960 | Kaiser |
| 3,004,779 | A | 10/1961 | Cullen et al. |
| 3,140,106 | A | 7/1964 | Thomas et al. |
| 3,189,370 | A | 6/1965 | Marshail |
| 3,240,643 | A | 3/1966 | Schroeder et al. |
| 3,287,194 | A | 11/1966 | Waddell, Jr. |
| 3,318,620 | A | 5/1967 | Cullen et al. |
| 3,333,325 | A | 8/1967 | Stanley |
| 3,462,177 | A | 8/1969 | Skinner et al. |
| 3,538,728 | A | 11/1970 | Tribey |
| 3,603,719 | A | 9/1971 | Lejeune |
| RE28,155 | E | 9/1974 | Dow et al. |
| 3,856,052 | A | 12/1974 | Feucht |
| 3,919,026 | A | 11/1975 | Mizutani et al. |
| 4,033,612 | A | 7/1977 | Chevalier |
| 4,063,757 | A | 12/1977 | Fuhrmann |
| 4,323,089 | A | 4/1982 | Kadono et al. |
| 4,330,143 | A | 5/1982 | Reneau |
| 4,344,908 | A | 8/1982 | Smith et al. |
| 4,351,366 | A | 9/1982 | Angioletti |
| 4,377,186 | A | 3/1983 | Genini et al. |
| 4,411,845 | A | 10/1983 | Tanahashi et al. |
| 4,422,993 | A | 12/1983 | Smith et al. |
| 4,430,383 | A | 2/1984 | Smith et al. |
| 4,436,689 | A | 3/1984 | Smith et al. |
| 4,445,543 | A | 5/1984 | Mead |
| 4,634,153 | A | 1/1987 | Kishton |
| 4,826,354 | A | 5/1989 | Adorian |
| 4,924,679 | A | 5/1990 | Brigham et al. |
| 4,950,001 | A | 8/1990 | Briggs |
| 5,182,147 | A | 1/1993 | Davis |
| 5,480,193 | A | 1/1996 | Echols et al. |
| 5,485,870 | A | 1/1996 | Kraik |
| 5,639,128 | A | 6/1997 | Belcher |
| 5,647,563 | A | 7/1997 | Gantner et al. |
| 5,685,576 | A | 11/1997 | Wolfe et al. |
| 5,698,278 | A | 12/1997 | Emond et al. |
| 5,860,682 | A | 1/1999 | Belcher |
| 5,893,681 | A | 4/1999 | Boden et al. |
| 6,110,550 | A | 8/2000 | Jarrin et al. |
| 6,334,466 | B1 | 1/2002 | Jani et al. |
| 6,659,510 | B1 | 12/2003 | Ikegami et al. |
| 6,874,542 | B2 | 4/2005 | Mayau et al. |
| 6,923,477 | B2 | 8/2005 | Buon et al. |
| 7,243,686 | B2 | 7/2007 | Burke et al. |
| 7,712,792 | B2 | 5/2010 | Burke et al. |
| 7,735,524 | B2 | 6/2010 | Burke et al. |
| 7,743,792 | B2 | 6/2010 | Burke et al. |
| 2003/0178085 | A1 | 9/2003 | Burke et al. |
| 2004/0066035 | A1 | 4/2004 | Buon et al. |
| 2004/0112454 | A1 | 6/2004 | Takagi |
| 2004/0146676 | A1 | 7/2004 | Ikemoto |
| 2004/0256016 | A1 | 12/2004 | Arima et al. |
| 2007/0024051 | A1 | 2/2007 | Witz et al. |
| 2009/0320951 | A1 | 12/2009 | Witz et al. |
| 2010/0059133 | A1 | 3/2010 | Witz et al. |
| 2010/0180976 | A1 | 7/2010 | Witz et al. |
| 2010/0224277 | A1 | 9/2010 | Witz et al. |
| 2010/0229991 | A1 | 9/2010 | Witz et al. |
| 2010/0229992 | A1 | 9/2010 | Witz et al. |

FOREIGN PATENT DOCUMENTS

| | | |
|---|---|---|
| DE | 1 425 453 | 7/1969 |
| DE | 2 431 277 | 1/1975 |
| DE | 2 948 416 | 6/1981 |
| DE | 3 440 459 | 5/1986 |
| DE | 9207276 U1 | 10/1992 |
| DE | 9407409 U1 | 7/1994 |
| DE | 10 2005 046367 | 4/2006 |
| EP | 0 032 352 | 7/1981 |
| EP | 0 076 540 | 4/1983 |
| EP | 0183285 | 6/1986 |
| EP | A0215507 | 3/1987 |
| EP | 0 241 656 | 10/1987 |
| EP | A0438831 | 7/1991 |
| EP | 0 264 587 | 4/1998 |
| EP | 0 855 496 | 7/1998 |
| EP | 0 895 013 | 5/2000 |
| EP | 0 833 769 | 10/2001 |
| EP | 1288558 A | 3/2003 |
| EP | 1 344 969 | 9/2003 |
| EP | 1 428 748 | 6/2004 |
| EP | 1428748 A1 | 6/2004 |
| FR | 1499956 | 4/1966 |
| FR | 2194906 | 3/1974 |
| FR | 2235324 | 6/1974 |
| FR | 2753257 | 3/1998 |
| GB | 323352 | 1/1930 |
| GB | 550543 | 1/1943 |
| GB | 591307 | 8/1947 |
| GB | 591560 | 8/1947 |
| GB | 741643 | 12/1955 |
| GB | 849121 | 9/1960 |
| GB | 850131 | 9/1960 |
| GB | 895553 | 5/1962 |
| GB | 1019370 | 2/1966 |
| GB | 1034956 | 7/1966 |
| GB | 1312509 | 4/1973 |
| GB | 1383313 | 2/1974 |
| GB | 1477433 | 6/1977 |
| GB | 2070725 A | 9/1981 |
| GB | 2104992 | 3/1983 |
| GB | 2104996 | 3/1983 |
| GB | 2107819 | 5/1983 |
| GB | 2186657 | 8/1987 |
| GB | 2223817 | 4/1990 |
| GB | 2289107 | 11/1995 |
| GB | 2303574 | 2/1997 |
| GB | 2312725 | 11/1997 |
| GB | 2339251 | 1/2000 |
| GB | 2363440 | 12/2001 |
| GB | 2366345 | 3/2002 |
| GB | 2408307 A | 5/2005 |
| JP | 1283494 | 11/1989 |
| JP | 03-075132 | 3/1991 |
| JP | 08011138 | 1/1996 |
| JP | 08336845 | 12/1996 |
| JP | 11325333 | 11/1999 |
| SU | 396271 | 8/1973 |
| WO | WO 9324731 | 12/1993 |
| WO | WO 963592 | 11/1996 |
| WO | WO 9700805 | 1/1997 |
| WO | WO 0196772 | 12/2001 |
| WO | WO 2004044472 | 5/2004 |
| WO | WO 2004079248 | 9/2004 |
| WO | WO 2005119150 A2 | 12/2005 |
| WO | WO 2006044053 | 4/2006 |
| WO | WO 2007/129092 | 11/2007 |
| WO | WO 2009/034340 | 3/2009 |
| WO | WO 2009/034357 | 3/2009 |
| WO | WO 2009/034364 | 3/2009 |

OTHER PUBLICATIONS

Patent Application entitled, "Improvements Relating to Pipe", by Joel Aron Witz filed on Mar. 12, 2010 as U.S. Appl. No. 12/677,852.
Patent Application entitled, "Improvements Relating to Hose End Fittings", by Joel Aron Witz filed on Jun. 15, 2010 as U.S. Appl. No. 12/667,853.
Patent Application entitled, "Hose", by Joel Aron Witz filed on Jun. 10, 2010 as U.S. Appl. No. 12/667,854.
International Search Report and Written Opinion for PCT Application Serial No. PCT/GB2008/003098, dated Dec. 12, 2008, 6 pages.
International Preliminary Report on Patentability for PCT Application Serial No. PCT/GB2008/003098, dated Mar. 16, 2010, 5 pages.
International Search Report and Written Opinion for PCT Application Serial No. PCT/GB2008/003135, dated Dec. 12, 2008, 7 pages.

International Preliminary Report on Patentability for PCT Application Serial No. PCT/GB2008/003135, dated Mar. 16, 2010, 6 pages.
International Search Report and Written Opinion for PCT Application Serial No. PCT/GB2008/003121, dated Dec. 15, 2008, 10 pages.
International Prelimiary Report on Patentability for PCT Application Serial No. PCT/GB2008/003121, dated Mar. 16, 2010, 7 pages.
International Search Report for PCT Application Serial No. PCT/GB01/02562.
International Preliminary Examination Report for PCT Application Serial No. PCT/GB01/02562, published on Dec. 20, 2001.
International Preliminary Report on Patentability for PCT Application No. PCT/GB07/002446, dated Jan. 15, 2009.
International Preliminary Report on Patentability and Written Opinion for PCT Application Serial No. PCT/GB2007/003058, dated Feb. 26, 2009.
Translation of Office Action for Chinese Patent Application Serial No. 2007800216292, dated Mar. 10, 2010, 9 pages.
Translation of Office Action for Chinese Patent Application Serial No. 2007800378028, dated Mar. 8, 2010, 8 pages.
Translation of Office Action for Chinese Patent Application Serial No. 2007800378136, dated Mar. 10, 2010, 6 pages.
Translation of Decision of Rejection for Chinese Patent Application Serial No. 2007800378136 dated Nov. 12, 2010, 8 pages.

Fig.2.

IMPROVEMENTS RELATING TO HOSE

BACKGROUND OF THE INVENTION

1. Field of the Invention

This invention relates to hose, and more particular relates to hose suitable for use in cryogenic applications.

2. Description of the Related Art

There are many systems for transporting fluids between an offshore structure such as a ship or other platform and an undersea pipeline. Examples of such systems include:
(1) The conventional multi-buoy mooring (CMBM) system. In this system a riser runs directly from the offshore structure down to the pipeline, with supporting buoys arranged at intervals along the length of the hose.
(2) The single tower mono-mooring (STM) system. In this system a mooring tower is fixed to the seabed and extends to the surface of the sea. The mooring tower supports a riser extending from the surface of the sea to the pipeline. A hose or other pipe can extend from the offshore structure and be connected to the end of the hose at the top of the mooring tower.
(3) The single anchor-leg mooring (SALM) system. In this system, a buoy is located close to the offshore structure, the buoy being attached to, and supporting, a connector unit located on or near the seabed. A riser extends from the offshore structure to the connecting unit, then from the connecting unit to the pipeline. A further section of pipe runs from the connector unit to the pipeline.
(4) The catenary anchor-leg mooring (CALM) system. In this system, a buoy is located close to the offshore structure. A riser runs from the buoy to an underwater connector unit usually located on or near the seabed. A further section of pipe runs from the connector unit to the pipeline. A hose or other pipe can extend from the offshore structure and be connected to the end of the hose at the buoy. There are various configurations of the CALM system including the "Steep S" system, the "Lazy S" system and the "Chinese Lantern" system.

All the systems described above are well known in the art, and there are other possible systems that are not described above such as, for example, the use of an intermediate offshore structure. The essential feature of all these systems is that a riser is provided to deliver fluids from an offshore structure, such as a ship, to an underwater structure, such as a pipeline. The exact configuration of the riser, and of the support structure for the riser, can be varied depending prevailing conditions at the particular offshore location. Depending on the particular details of the system the riser comprises of submerged, floating and aerial sections.

There are also systems which involve the use of a submerged buoy, as described, for example, in WO96/36592. There are also systems involving the use of a vertically movable submerged buoy, such as those described in WO93/24731, and, more recently, in WO2006/044053 which essentially involves the use of the system described in WO93/24731 to transport cryogenic fluids.

All these types of system use rubber hose as the riser. A typical rubber hose has the following structure:
(1) A lining layer made of rubber.
(2) Multiple reinforcement layers of spirally applied high strength steel or polymeric reinforcing cords—these provide pressure and external load resistance.
(3) A helical steel wire outside the reinforcement layer, the helical wire being embedded within a rubber matrix.
(4) Further reinforcement layers of spirally applied high strength steel or polymeric reinforcing cords.
(5) A rubber cover.

It will be appreciated that there are numerous variations of this structure such as the inclusion of a collapse resistant metallic carcass to increase the depth of submergence, an annulus to provide a double barrier between the internal fluids and the sea, material to provide buoyancy and insulation, and the build up of the outer cover to provide variable stiffness along the hose length so as to help prevent overbending.

Rubber hoses are usually classified as being of a bonded construction. A possible variation is to use conventional flexible pipe of unbonded construction, particularly in the submerged sections of the riser. A typical flexible pipe has the following structure:
(1) An inner stainless steel metallic carcass for collapse resistance.
(2) A lining layer made of a thermoplastic such as, for example, polyethylene or polyamide.
(3) Multiple reinforcement layers of spirally applied high strength steel wires—these provide pressure and external load resistance.
(4) An optional layer of spirally applied insulation.
(5) An outer cover made of a suitable thermoplastic material such as, for example, polyethylene or polyimide.

The American Petroleum Institute's Recommended Practice For Flexible Pipe describes in some detail bonded and unbonded hose constructions and their use in the offshore environment.

Rubber hoses are very well suited to use in the systems described above, as they very tough and robust, and are known to be able to withstand the hostile conditions in which they are expected to operate. Rubber hoses are also flexible and are capable of being bent to small bend radii compared with their outer diameter. However, there is a problem with rubber hoses in that there is a limit on the lowest temperature at which they can operate effectively. For normal rubber, the lowest operating temperature is about −60° C. There are special rubbers available that can operate at temperatures down to about −100° C. However, rubber hoses cannot operate effectively at temperatures below about −100° C.

This means that rubber hoses are not suitable for applications which involve the transport of fluids at temperatures below about −100° C. In particular, such hoses are not suitable for the transportation of liquid natural gas (LNG), which typically requires the ability to operate at temperatures as low as about −162° C.

As noted above, WO 2006/044053 discloses a system for delivering cryogenic fluids from a ship to an underwater location using a system which utilises a vertically moving buoy. This patent envisages several possible types of riser for use with the system, in particular:
(1) The use of a conventional subsea pipe lined with a nickel alloy known as INVAR (registered trade mark).
(2) The use of a conventional cryogenic cargo hose structurally reinforced to resist hydrostatic forces.
(3) A pipe-in-pipe construction, which essentially involves the use of two concentric metal pipes.
(4) An arrangement of insulated hard pipe sections, the pipes typically being high nickel alloys, austenitic stainless steels and/or aluminium.

However, this patent does not give any details about the specific construction of a working riser suitable for use in transporting cryogenic fluids below the surface of the sea. Furthermore, this patent relates in part to the transportation of non-cryogenic fluids having temperatures in the range of −28.9° C. to −100° C., which can be transported perfectly effectively with conventional rubber hose.

Other patents which relate to the problem of cryogenic subsea pipelines include EP1428748A1, GB2186657A, GB2408307A, U.S. Pat. No. 4,826,354A1 and WO2005/119150A2.

The construction of hose capable of carrying cryogenic fluids below the sea is a longstanding technical problem. Although patents, such the ones mentioned above, disclose solutions to the problem in general terms, in practice there are no commercially available solutions, owing to the difficulty and costs associated with the construction of the riser.

BRIEF DESCRIPTION OF THE DRAWINGS

Reference is now made to the accompanying drawings, in which.

DETAILED DESCRIPTION OF THE INVENTION

It is an object of the invention to provide an improved hose for use in conveying cryogenic fluids.

It is an particular object of the present invention to provide a hose capable of transporting cryogenic fluids below the surface of the sea.

Broadly, the invention relates to a hose which comprises an outer tube arranged around an inner tubular structure. The outer tube is a rubber hose, whilst the inner tubular structure relates to the entire structure provided within the outer tube. In particular, the inner tubular structure includes a so-called composite hose or a bellows hose, in combination with any extra insulation necessary to protect the outer tube from the low temperature of cryogenic fluid flowing within the inner tubular structure. The inner tubular structure may include insulation in addition to the insulation effect provided by the composite hose, and also includes any annular space defined between the outer tube and the inner tubular structure.

According to a first aspect of the invention there is provided a hose comprising an inner tubular structure and an outer tube, wherein the inner tubular structure comprises a tubular body disposed between inner and outer gripping members, the tubular body including a sealing layer, and being formed of a material capable of withstanding cryogenic temperatures, wherein the outer tube comprises a rubber layer and a reinforcing layer disposed around the rubber layer, and wherein the inner tubular structure has insulation properties sufficient to protect the outer tube from the low temperature of cryogenic fluid flowing within the inner tubular structure.

In this aspect of the invention, the inner tubular structure essentially comprises a composite hose, while the outer tube comprises a rubber hose. Both composite hose and rubber hose are well known in the art. Prior to the invention, no one contemplated putting the two types of hose together in order to solve the problems involved in transporting cryogenic fluids underwater. Examples of composite hose are described in, for example, WO01/96772, WO 2004/044472 and WO 2004/079248. Composite hose is known for use in transporting cryogenic fluids, but it does not possess the robustness associated with rubber hose, and is therefore not suitable for use in transporting fluids between the sea surface and the sea bed.

It is an important feature of the invention that the rubber layer(s) in the outer tube are adequately protected from the temperature of the cryogenic fluids being transported through the inner tubular structure. In the case of normal rubbers having an operating temperature down to −60° C., the surface temperature at the innermost rubber layer of the outer tube should be no less than −60° C. In the case of special rubbers having an operating temperature down to −100° C., the surface temperature at the innermost rubber layer of the outer tube should be no less than −100° C.

The required insulation can be achieved in a number of ways. One way is to rely solely on the insulation provided by the tubular body of the inner tubular structure. The materials of the tubular body may be such that they provide the required insulation. Furthermore, in the preferred embodiment, the materials of the tubular body are formed by wrapping multiple layers around a mandrel, in a process which leaves a certain amount of air within the layers, which provides additional insulation.

In another embodiment, the inner tubular structure is provided with an insulation layer formed of an insulating material. The insulation layer may be a special layer of the tubular body, or may be a layer formed around the outer gripping member.

In another embodiment, an insulation layer formed of an insulating material is provided between the inner tubular structure and the outer tube.

In another embodiment the insulation may be provided by a particulate insulating material (e.g. beads) disposed in the space between the inner tubular structure and the outer tube. The insulating particles may typically comprise of glass microspheres, perlite, polystyrene particles. The particles may be placed in the space simply by pouring them between the inner tubular structure and the outer tube.

The required insulation may be provided by any combination of the specific techniques described above.

The tubular body preferably comprises at least at least two of the reinforcing layers with the sealing layer sandwiched therebetween.

Preferably, a further reinforcing layer is provided between the outer gripping member and the axial strengthening means.

The ultimate strength of the reinforcing layer(s) is preferably between 100 and 700 kN for an 8" (200 mm) diameter inner tubular structure. It is preferable that the bend strain at failure of the reinforcing layer(s) is in the range 2% to 15%.

It is preferred that the inner tubular structure further includes an axial strengthening means. Preferably the axial strengthening means comprises a generally tubular sheath formed of a sheet of material provided in a tubular shape, such that the sheath can maintain the integrity of its tubular shape when subjected to axial tension. The inner tubular structure may be provided with two or more tubular sheaths in order to further improve the performance of the inner tubular structure under axial tension. It is particularly preferred that the axial strengthening means is provided in the form of a generally tubular braid. In this specification the term "braid" refers to a material which is formed of two or more fibres or yarns which have been intertwined to form an elongated structure. It is a feature of braid that it can elongate when subjected to an axial tension. It is a further feature of braid that, when provided in a tubular form, its diameter will reduce when the braid is subjected to axial tension. Thus by providing a tubular braid around the tubular body, or within the structure of the tubular body, the braid will exert a radially inward force on at least part of the tubular body when subjected to axial tension. It is preferred that the entire tubular sheath is provided in the form of the braid. However, it is possible for only one or more parts of the length of the tubular sheath to be provided in the form of the braid. It is also preferred that the braid extends all the way around the circumference of the tubular sheath. However, it is possible for only part of the circumference of the tubular sheath to be provided in the form of the braid. The braid may be provided in a biaxial form (i.e. in which the braid is formed of only two intertwining fibres or yarns) or in a triaxial form (i.e. in which there are also longitudinally extending fibres or yarns, for increased axial strength).

Although it is preferred to provide the axial strengthening means in the form of a braid, it may be provided in other forms which meet the functional requirements specified above. Thus, the axial strengthening means may be provided as a suitable arrangement of cords or ropes helically wrapped around the tubular body.

Thus, alternatively, or in addition, the axial strengthening means comprises a plurality of axial strengthening strips extending along the length of the inner tubular structure. The axial strengthening strips are preferably equi-spaced around the circumference of the inner tubular structure. There may be two, three, four, five, six, seven, eight or more strips. More preferably there are three, four, five or six strips, with four or six strips being most preferred. Preferably each axial strengthening strip is made of a fabric having a warp and a weft. More preferably, the warp of each axial strengthening strip is arranged at an angle of 0° to 10° to the longitudinal axis of the inner tubular structure. Still more preferably, the warp of each axial strengthening strip is arranged at an angle of 0° to 5° to the longitudinal axis of the inner tubular structure. Most preferably, the warp of each axial strengthening strip is arranged at an angle of 0° to 2° to the longitudinal axis of the inner tubular structure.

The axial strengthening means may be disposed between the outer gripping member and the tubular body. Alternatively, the axial strengthening means may be incorporated within the tubular body, i.e., between the reinforcing layer and the sealing layer.

The materials of construction of the inner tubular structure should be selected to enable it to perform in the environment for which it is intended. Thus, there is a need for the inner tubular structure to be able to transport pressurised fluids therethrough without leakage of the fluid through the walls of thereof. There is also a need for the inner tubular structure to withstand repeated flexing, and to withstand the axial stresses caused by the combination of the inner tubular structure and fluid weight. The main purpose of the or each reinforcing layer is to withstand the hoop stresses which inner tubular structure is subjected to during transport of fluids therethrough. Thus, any reinforcing layer which has the required degree of flexibility, and which can withstand the necessary stresses, will be adequate. Also, if the inner tubular structure is intended for transporting cryogenic fluids, then the or each reinforcing layer must be able to withstand cryogenic temperatures.

It is preferred the or each reinforcing layer is formed of a sheet of material which has been wound into a tubular form by winding the sheet material in a helical manner. This means that the or each reinforcing layer does not have much resistance to axial tension, as the application of an axial force will tend to pull the windings apart. The or each reinforcing layer may comprise a single continuous layer of the sheet material, or may comprise two or more single continuous layers of the sheet material. However, more usually (and depending on the length of the inner tubular structure) the or each layer of the sheet material would be formed of a plurality of separate lengths of sheet material arranged along the length of the inner tubular structure.

In the preferred embodiment the or each reinforcing layer comprises a fabric, most preferably a woven fabric. The or each reinforcing layer may be a natural or synthetic material. The or each reinforcing layer is conveniently formed of a synthetic polymer, such as a polyester, a polyamide or a polyolefin. The synthetic polymer may be provided in the form of fibres, or a yarn, from which the fabric is created.

When the or each reinforcing layer comprises a polyester, then it is preferably polyethylene terephthalate. When the or each reinforcing layer comprises a polyamide, then it may be an aliphatic polyamide, such as a nylon, or it may be an aromatic polyamide, such as an aramid compound. For example, the or each reinforcing layer may be a poly-(p-phenyleneterephthalamide) such as KEVLAR (registered trade mark).

When the or each reinforcing layer comprises a polyolefin, then it may be a polyethylene, polypropylene or polybutylene homopolymer, or a copolymer or terpolymer thereof, and is preferably monoaxially or biaxially oriented. More preferably, the polyolefin is a polyethylene, and most preferably the polyethylene is a high molecular weight polyethylene, especially UHMWPE. In the preferred embodiment, the axial strengthening means is also UHMWPE.

The UHMWPE used in the present invention would generally have a weight average molecular weight above 400,000, typically above 800,000, and usually above 1,000,000. The weight average molecular weight would not usually exceed about 15,000,000. The UHMWPE is preferably characterised by a molecular weight from about 1,000,000 to 6,000,000. The UHMWPE most useful in the present invention is highly oriented and would usually have been stretched at least 2-5 times in one direction and at least 10-15 times in the other direction.

The UHMWPE most useful in the present invention will generally have a parallel orientation greater than 80%, more usually greater than 90%, and preferably greater than 95%. The crystallinity will generally be greater than 50%, more usually greater than 70%. A crystallinity up to 85-90% is possible.

UHMWPE is described in, for example, U.S. Pat. No. 4,344,908, U.S. Pat. No. 4,411,845, U.S. Pat. No. 4,422,993, U.S. Pat. No. 4,430,383, U.S. Pat. No. 4,436,689, EP-A-183285, EP-A-0438831, and EP-A-0215507.

It is particularly advantageous that the or each reinforcing layer comprises a highly oriented UHMWPE, such as that available from DSM High Performance Fibres BV (a Netherlands company) under the trade name DYNEEMA, or that available from the US corporation AlliedSignal Inc. under the trade name SPECTRA. Additional details about DYNEEMA are disclosed in a trade brochure entitled "DYNEEMA; the top performance in fibers; properties and application" issued by DSM High Performance Fibers BV, edition 02/98. Additional details about SPECTRA are disclosed in a trade brochure entitled "Spectra Performance Materials" issued by AlliedSignal Inc., edition 5/96. These materials have been available since the 1980s.

In the preferred embodiment, the or each reinforcing layer comprises a woven fabric formed of fibres arranged in a weft and warp direction. We have found that it is particularly advantageous if the or each reinforcing layer is arranged such that the fabric warp direction is at an angle of less than 20° to the axial direction of the inner tubular structure; we also prefer that this angle is greater than 5°. In the preferred embodiment, the or each reinforcing layer is arranged such that the fabric warp direction is at an angle of from 10° to 20°, most preferably about 15°, to the axial direction of the inner tubular structure.

The purpose of the sealing layer is primarily to prevent the leakage of transported fluids through the tubular body. Thus, any sealing layer which has the required degree of flexibility, and which can provide the desired sealing function, will be adequate. Also, if the inner tubular structure is intended for transporting cryogenic fluids, then the sealing layer must be able to withstand cryogenic temperatures.

The sealing layer may be made from the same basic materials as the or each reinforcing layer, in particular UHMWPE. As an alternative, the sealing layer may be a fluoropolymer, such as: polytetrafluoroethylene (PFTE); a fluorinated ethylene propylene copolymer, such as a copolymer of hexafluoropropylene and tetrafluoroethylene (tetrafluoroethyleneperfluoropropylene) available from DuPont Fluoroproducts under the trade name Teflon FEP; or a fluorinated hydrocarbon—perfluoralkoxy—available from DuPont Fluoroproducts under the trade name Teflon PFA. These films may be made by extrusion or by blowing.

We prefer that the sealing layer is formed of a sheet of material which has been wound into a tubular form by winding the sheet material in a helical manner. As with the reinforcing layers, this means that the or each sealing layer does not have much resistance to axial tension, as the application of an axial force will tend to pull the windings apart. The sealing layer may comprise a single continuous layer of the sheet material, or may comprise two or more single continuous layers of the sheet material. However, more usually (and depending on the length of the inner tubular structure) the or each layer of the sheet material would be formed of a plurality of separate lengths of sheet material arranged along the length of the inner tubular structure. If desired the sealing layer may comprise one or more heat shrinkable sealing sleeves (i.e. tubular in form) which are arranged over the inner reinforcing layer.

We prefer that the sealing layer comprises a plurality of overlapping layers of film. Preferably there would be at least 2 layers, more preferably at least 5 layers, and still more preferably at least 10 layers. In practice, the sealing layer may comprise 20, 30, 40, 50, or more layers of film. The upper limit for the number of layers depends upon the overall size of the inner tubular structure, but it is unlikely that more than 100 layers would be required. Usually, 50 layers, at most, will be sufficient. The thickness of each layer of film would typically be in the range 50 to 100 micrometers.

It will, of course, be appreciated that more than one sealing layer may be provided.

As discussed above, if there is a separate insulation layer, then it may affixed to the inside of the outer tube, i.e., disposed inside the rubber layer. Alternatively, the insulation layer may be disposed between the inner tubular structure and the outer tube as a layer which is separate from the inner tubular structure and the outer tube.

However, it is preferred that the insulation layer is incorporated in the inner tubular structure. The insulation layer may be affixed to the outside of the inner tubular structure, i.e. disposed outside the outer gripping member, or it may be disposed within the outer gripping member between the outer gripping member and the sealing layer of the tubular body. The insulation layer may comprise any material conventionally used to provide insulation in cryogenic equipment, such as a synthetic foam material.

In one preferred embodiment, the insulation layer comprises an elongate member, made of an insulating material, having opposing longitudinal edges, the elongate member being helically wound around the tubular body such that the opposing longitudinal edges of the layer are in an adjacent or overlapping arrangement, wherein each longitudinal edge includes a formation capable of interengaging with a cooperating formation on the opposing longitudinal edge. The elongate member is preferably disposed outside the outer gripping member, and thereby forms a cover for the outer layer. A suitable elongate member is described in more detail in WO2004/044472.

In another preferred embodiment, the insulation layer includes a fabric formed of basalt fibres. Suitable basalt fibre fabrics are available from the Sudaglass Fiber Company under the trade designations BT-5, BT-8, BT-10, BT-11 and BT-13. The preferred thickness of the fabric is from about 0.1 mm up to about 0.3 mm. If desired, a plurality of layers of the basalt fabric may be employed.

It will be appreciated that more than one insulation layer may be provided, and that the inner tubular structure may include two or more different types of insulation layer.

An end fitting is preferably provided at each end of the inner tubular structure. The end fitting is preferably of the type described in WO01/96772 or WO 2004/079248.

The inner and outer gripping members of the inner tubular structure are preferably helical gripping members, more preferably helical wires. Thus, the gripping members preferably each forms a coil which grip and retain the tubular body, and any other intervening layers. Preferably the inner and outer coils are applied in a helical configuration having the same pitch, and the position of the coils of the outer coil are positioned half a pitch length offset from the position of the coils of the inner coil.

Advantageously the components of the inner tubular structure are all movable relatively to one another, i.e., they are not bonded or otherwise fixedly adhered to one another. The allows the layers of the inner tubular structure to move relatively to one another during flexing thereof.

According to a second aspect of the invention there is provided a hose comprising an inner tubular structure, an outer tube and an insulation layer, wherein the inner tubular structure comprises a tubular bellows, wherein the outer tube comprises a rubber layer and a reinforcing layer disposed around the rubber layer, wherein the insulation layer is either incorporated in the inner tubular structure and/or is disposed between the inner tubular structure and the outer tube, wherein the inner tubular structure is movable relative to the outer tube during flexing of the hose, and wherein the inner tubular structure has insulation properties sufficient to protect the outer layer from the low temperature of cryogenic fluid flowing within the inner tubular structure.

In this aspect of the invention, the inner tubular structure essentially comprises a bellows hose, while the outer tube comprises a rubber hose. Both bellows hose and rubber hose are well known in the art. Prior to the invention, no one contemplated putting the two types of hose together in order to solve the problems involved in transporting cryogenic fluids underwater. It should be noted that there are examples of bellows hose comprising an outer rubber layer, but in these examples the rubber layer is integral with the bellows, so that relative movement between the two is not possible. Examples of bellows hose are described in US2004112454 and US2004146676.

It is an important feature of the invention that the rubber layer(s) in the outer tube are adequately protected from the temperature of the cryogenic fluids being transported through the inner tubular structure. In the case of normal rubbers having an operating temperature down to −60° C., the surface temperature at the innermost rubber layer of the outer tube should be no less than −60° C. In the case of special rubbers having an operating temperature down to −100° C., the surface temperature at the innermost rubber layer of the outer tube should be no less than −100° C.

The required insulation can be achieved in a number of ways. In one embodiment, the inner tubular structure is provided with an insulation layer formed of an insulating material. The insulation layer may be a special layer of the tubular body, or may be a layer formed around the outer gripping member.

In another embodiment, an insulation layer formed of an insulating material is provided between the inner tubular structure and the outer tube.

In another embodiment the insulation may be provided by a particulate insulating material (e.g. beads) disposed in the space between the inner tubular structure and the outer tube. The insulating particles may typically comprise of glass microspheres, perlite, polystyrene particles. The particles may be placed in the space simply by pouring them between the inner tubular structure and the outer tube from one end of the hose.

The required insulation may be provided by any combination of the specific techniques described above.

The inner tubular structure preferably includes an end fitting at each end of the tubular bellows. The tubular bellows has a convoluted or corrugated profile. The convolutions or corrugations may be sinusoidal, U-shaped or shaped like the Greek letter omega, Ω. The convolutions may be circumferential, or may be arranged in a spiral. In general, only the sinusoidal convolutions would be arranged in a spiral.

It will be appreciated that the tubular bellows is designed to act as a sealing layer.

In an embodiment, the inner tubular structure includes a second tubular bellows arranged around the first bellows.

The bellows of the inner tubular structure is preferably reinforced to provide additional strengthening. This may be achieved by reinforcement of the bellows itself, or by providing the inner tubular structure with a separate reinforcing layer. One means of providing additional strengthening is to provide a tubular braid of stainless steel wires or polymeric high strength fibres applied over the tubular bellows. Another means of providing additional strengthening is to apply helically wound ropes or cords over the tubular bellows. Typically an armoured layer is provided as the outer layer of the hose.

When two tubular bellows are provided, the insulation layer may be provided between the two bellows. In addition, or instead, a vacuum may be provided in the space between the two layers, in order to assist with the insulation.

The first and/or second tubular bellows may be made of metal, preferably stainless steel.

According to an advantageous feature of both the first and second aspects of invention, the inner tubular structure is not integral with the outer tube, so that the inner tubular structure can be move relative to the outer tube when the hose is flexed.

In a preferred embodiment, an annular space is provided between the inner tubular structure and the outer tube. One or more spacers is preferably provided between in the inner tubular structure and the outer tube in order to maintain the outer tube in a spaced relationship with respect to the inner tubular structure. The or each spacer preferably comprises a ring extending around the outside of the inner tubular structure. A plurality of said rings may be provided along the length of the inner tubular structure. The or each spacer ring may be, for example, polyurethane, PTFE, or a wood such as balsa or cork. The or each spacer ring may be rubber, if there is sufficient underlying insulation to protect the rubber spacer from the temperature of the cryogenic fluids to be transported through the inner tubular structure.

In an another embodiment, the spacer may be in the form of a rope or rod wrapped in a helical manner between the inner tubular structure and the outer tube. The wrapping may be in a long and/or a close pitch. The rope or rod may be, for example, a polyester rope, a polyurethane strip of rectangular cross section or a rubber of circular cross section.

In both the first and second aspect of the invention the insulation properties of the material within the inner tubular structure should be selected such that the temperature to which the rubber of the outer hose is subjected is above the minimum working temperature of the rubber. For most rubbers, this temperature will be about −60° C., although there are special rubbers which will operate effectively at temperatures above −100° C. It will also be appreciate that when there is an annular space between the inner tubular structure and the outer tube, this space may provide some of the required insulation.

The outer tube may be the same in both the first and second aspects of the invention.

The inner rubber layer is a finer layer which may be a natural or synthetic rubber. For example, the rubber layer may be made from ethylene-propylene diene monomers, The rubber may be a neoprene rubber, or a nitrile rubber, such as an acrylonitrile-butadiene rubber. Special rubbers, such as silicone rubber, can be used when it is desired that the outer tube is capable of operating at temperatures as low as −100° C. The composition of the rubber layer may be entirely conventional. The rubber layer may be constructed by the known methods of seamless liner, a liner with a longitudinal seam and a liner of the wrapped construction. The liner constructions which have a join as a result of the manufacturing method are made leakproof by the curing or vulcanisation process.

The reinforcing layer of the rubber hose may be a fabric or metallic, or it may be a fabric incorporating metallic parts. The fabric and/or metal may be wound around the inner rubber layer.

The reinforcing layer may instead comprise a polymeric material which optionally incorporates additional metallic reinforcement.

More than one reinforcement layer may be provided. In addition, different types of reinforcement layers may be provided.

It is preferred to use polymeric materials and austenitic stainless steels suitable for low temperature service in the reinforcing layer. Thus, the reinforcing layer is desirably made from materials such as a polyester, or an aramid such as Kevlar®, or UHMWPE. The purpose of providing such a material is for additional protection in the event that the rubber part of the hose fails, owing to contact with a very low temperature fluid.

The outer tube may also include a helical wire, preferably a steel wire. The helical wire may be embedded in a rubber matrix, or a matrix of another polymeric material.

The outer tube may further include an outer cover layer, which is typically also made of rubber.

The layers of the outer tube may be assembled together with conventional end fittings or nipples, then cured or vulcanised, to provide an integrated outer tube in which all the layers are intimately bonded together and also bonded to the nipples at the ends of the outer tube; this prevents the layers of the outer tube from slipping relative to one another. This contrasts with the layers of the inner tubular structure, which are preferably not bonded together, and which are capable of moving relative to one another. Likewise, the inner tubular structure is preferably not bonded to the outer tube, so that the inner tubular structure can move relative to the outer tube.

The inner rubber layer may be a seamless rubber tube formed by extrusion, or may have a seam which is sealed by vulcanisation.

The end fittings or nipples are made of metals suitable for low temperature service. It is preferable to use metals such as austenitic stainless steels which are suitable for temperatures below −100° C.

It is preferable for the end fitting surfaces exposed to the marine environment to be corrosion resistant or to have a protective anti-corrosion layer.

The dimensions of the inner tubular structure and the outer tube may be selected either so that the inner tubular structure and the outer tube are in contact, or, preferably, so that there is a gap between the inner tubular structure and the outer tube. If there is a gap between the inner tubular structure and the outer tube, then spacers may be provided in the gap in order to maintain a desired spacing between the inner tubular structure and the outer tube.

It is preferable to monitor the gap for signs of leakage from the inner tubular structure or the outer tube or both. To that end, the hose according to the invention may also be provided with a leak detection means for detecting a leak in the gap. A number of leak detection means may be provided. For example a pressure detector may be provided to detect an increase of pressure caused by the ingress into the gap of pressurised liquid from within the inner tubular structure. In addition, or instead, a chemical detector can be provided to detect the presence of specific gases or liquids (eg methane or seawater) within the gap. The hose according to the invention is useful in a wide variety of applications, but it is especially useful in the transportation of cryogenic fluids, especially fluids at a temperature below −100° C., more preferably fluids at a temperature at or below about −104° C. (i.e. the boiling point of ethylene), and most preferably fluids at a temperature at or below about −150° C. The hose can effectively transport LNG at temperatures of about −162° C., and can effectively transport liquid oxygen or nitrogen at temperatures of about −183° C. or −196° C. respectively. Such fluids cannot be effectively conveyed by conventional rubber hoses. The lowest practical temperature at which the hose would be used would be from about −200° C. to −220° C.

The inner diameter of the outer tube is preferably at least 150 mm. More preferably, the inner diameter of the inner tubular structure (which is, in effect, the inner diameter of the hose itself) is preferably at least 150 mm. The inner diameter of the hose may be as large as 400 mm or even as large as 600 mm or 800 mm. It will be appreciated that the inner tubular structure and the outer tube are dimensioned so that the inner tubular structure fits within the outer tube leaving the desired gap. Typically this gap is from about 10 mm to about 100 mm, most preferably about 50 mm. The thickness of the inner tubular structure is typically about 10 to 20 mm and the thickness of the outer tube is typically about 75 to 100 mm.

The hose is typically supplied in lengths from 5 m to 20 m, although it is possible to supply lengths of hose that are longer or shorter. The hose would generally be supplied in lengths of about 11 m, as this is a typical size for commercially available lengths of rubber hose. If the total length of hose required for any particular application is more than the length of the individual section, then two or more lengths of the hose can be secured together until the desired length has been provided. In some applications the hose is assembled by passing a string of inner tubular structure through a string of outer tube until the ends of the two strings align to make the required hose length. It will be appreciated that the individual lengths of the inner tubular structure and the outer tube component sections do not have to be identical.

The material of the inner tubular structure is preferably selected such that when a cryogenic fluid flows through the structure, the temperature drop across the inner tubular structure is at least 4° C., preferably at least 20° C., more preferably at least 50° C., and most preferably at least 60° C.

The ends of the inner tubular structure and the outer tube are each terminated with an appropriate end fitting at each end thereof. It is possible for the end fittings of the inner tubular structure and the outer tube to be co-terminus, i.e., the inner tubular structure and outer tube are of substantially the same length. However, the end fittings of the inner tubular structure may be offset longitudinally relative to the end fittings of the outer tube.

According to another aspect of the invention there is provided a string of hose comprising a plurality of sections of hose described above connected end to end.

According to another aspect of the invention there is provided a method of making a hose comprising forming an inner tubular structure as described above, forming an outer tube as described above, inserting the inner tubular structure into the outer tube, and moving the inner tubular structure through the outer tube until it reaches a preselected position within the outer tube.

According to another aspect of the invention there is provided a method of making a hose comprising forming a plurality of inner tubular structures as described above, forming a plurality of outer tubes as described above, connecting the inner tubular structures end to end to form a string of inner tubular structures, connecting the outer tubes end to end to form a string of outer tubes, inserting the string of inner tubular structure into one end of the string of outer tubes, and moving the string of inner tubular structures through the string of outer tubes until it reaches a preselected position within the string of outer tubes.

In general, the operating pressure of the hose would be in the range from about 500 kPa gauge up to about 2000 kPa gauge, or possibly up to about 2500 kPa gauge. These pressures relate to the operating pressure of the hose, not the burst pressure (which must be several times greater). The volumetric flow rate depends upon the fluid medium, the pressure and the inner diameter. Flowrates from 1000 $m^3/h$ up to 12000 $m^3/h$ are typical.

The hose according to the invention is particularly useful in applications which involve the transportation of fluids, especially cryogenic fluids, from a surface offshore structure to another surface offshore structure and/or to a subsurface offshore structure, or from a subsurface offshore structure to a surface. In particular, the hose may be useful in applications in which the hose floats on the surface of water, applications in which the hose extends underwater; and applications in which the hose extends through the air. The hose may also be used in combinations of these applications.

The surface offshore structure may be a permanent structure or a temporary structure, and is disposed at the surface of the water; it will be appreciated that in normal circumstances some of the structure will extend above the water surface and some of the structure will be submerged. A permanent structure is one which, after installation, remains permanently fixed in position above the seabed. Examples of permanent structures include a steel jacket support structure and a gravity base support structure. A temporary structure is one which can be moved from location to location. Examples of a temporary structure is a floatable vessel, usually having a steel or concrete hull, such as a ship or barge or semisubmersible or tension leg platform. Another example of a temporary structure is a floating production storage and off-loading unit. The surface offshore structure may have means for producing oil or gas from beneath the seabed. In addition, or instead, the surface offshore structure may have means for storing oil or gas, and the gas may be in liquid form.

The subsurface offshore structure is located beneath the water surface, i.e., it is submerged in the water. It may be located on the seabed. One example of a subsurface offshore structure is an underwater pipeline, which will typically be provided on the seabed.

Thus according to another aspect of the invention, there is provided a system for transporting fluids between a surface offshore structure and a subsurface offshore structure comprising a riser operatively connected to the surface offshore structure and to the subsurface offshore structure in such a way that the fluid can flow from the surface offshore structure to the subsurface offshore structure or vice versa, wherein at least part of the riser is a hose according to the invention as described above.

According to another aspect of the invention, there is provided a system for transporting fluids between two surface offshore structures comprising a pipe operatively connected to the surface offshore structures in such a way that the fluid can flow from one of the surface offshore structures to the other or vice versa, wherein at least part of the pipe is a hose according to the invention as described above.

In one embodiment the system includes a buoy located at the surface, and the riser extends from the buoy to the subsurface offshore structure, and the hose is supported by the buoy. The CALM system described above is an example of such a system.

However, the system according to the invention may be a CBM system, where the hose according to the invention extends directly from the surface offshore structure to the subsurface offshore structure.

The system according to the invention may instead be a SALM system, where a surface buoy is attached to a subsurface connector located at the seabed, and the hose extends directly from the surface offshore structure to the subsurface connector.

In the systems described above, there is preferably further provided a fluid connector supported by the buoy. The fluid connector is adapted to be connected in fluid communication with the upper end of the riser extending from the subsurface offshore structure, and to be connected in fluid communication with a pipe extending from the subsurface offshore structure. In this way fluid can flow from the pipe to the riser through the connector. The connector is preferably rotatable, so that the surface offshore structure can rotate about the buoy. This form of connector is usually known as a "swivel connector". An example of a swivel connector suitable for transporting cryogenic fluids is disclosed in EP0833769.

The system according to the invention may also be used in the type of system described in WO2006/044053, in which a submersible buoy is provided. Thus, according to another aspect of the invention there is provided a system for transporting a cryogenic fluid between a surface offshore structure and a subsurface offshore structure, comprising: a) a first cryogenic riser having a first end and a second end, said first riser, wherein the vertical position of the first riser is adjustable, said second end of said first riser being located in a body of water and in fluid communication with said subsurface offshore structure; and b) a first submersible turret connector connected to said first end of said first riser, said first connector adapted for releasably connecting to the surface offshore structure water so that a cryogenic fluid can be communicated between said surface offshore structure and said first end of said first riser, said first connector being moored to the bottom of said body of water such that the vertical position of said first connector can be changed, wherein first connector adapted to allow said surface offshore structure to rotate around said first connector upon the surface of said body of water while said first vessel is connected to said first connector, wherein the first riser is a hose according to the invention, as described above.

It will be appreciated that the surface and subsurface offshore structures are disposed offshore, i.e., in a sea, ocean, lake, harbour or other body of water. However, there is no particular limitation on the distance of the structure from the shore, which may be, for example, a few meters, a few hundred meters, a few kilometers or several hundred kilometers.

According to another aspect of the invention there is provided a method of transporting a fluid having a temperature of −100° C. or less, preferably −104° C. or less, which comprises conveying the fluid from a surface offshore structure (such as a ship) to a subsurface offshore structure (such as a pipeline) using the hose according to the invention described above.

The present invention makes it possible to transport cryogenic materials, particularly LNG to subsea locations in an inexpensive and efficient manner. The invention makes use of a conventional rubber hose, which has been used for many years for the transportation of non-cryogenic fluids. This has the advantage that the operators of the tube are able to use the invention using hose which appears similar to the rubber hose with which they have great familiarity. Furthermore, existing rubber hose can be readily retrofitted with an inner tubular structure to provide a hose according to the invention.

Figure 1:
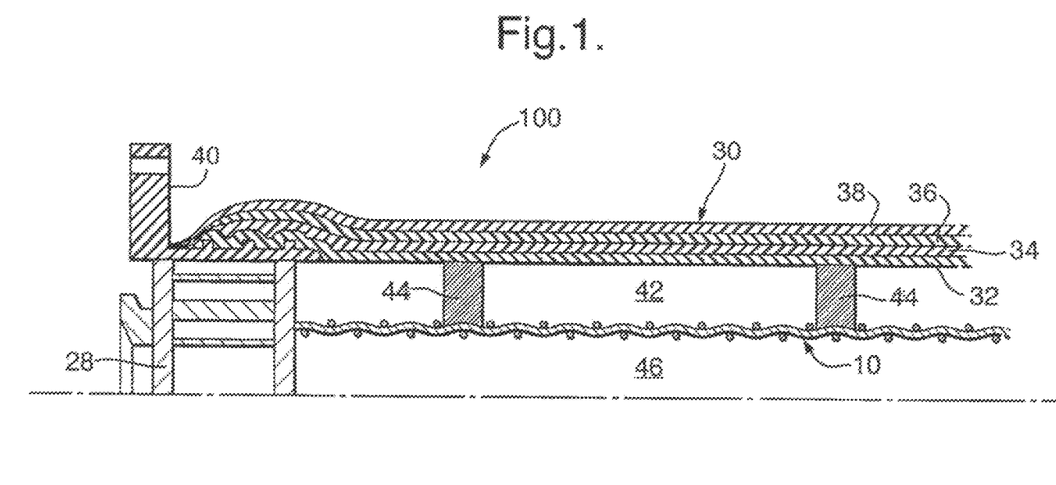
FIG. 1 is a cross-sectional view of a part of a hose according to the invention.
Figure 2:
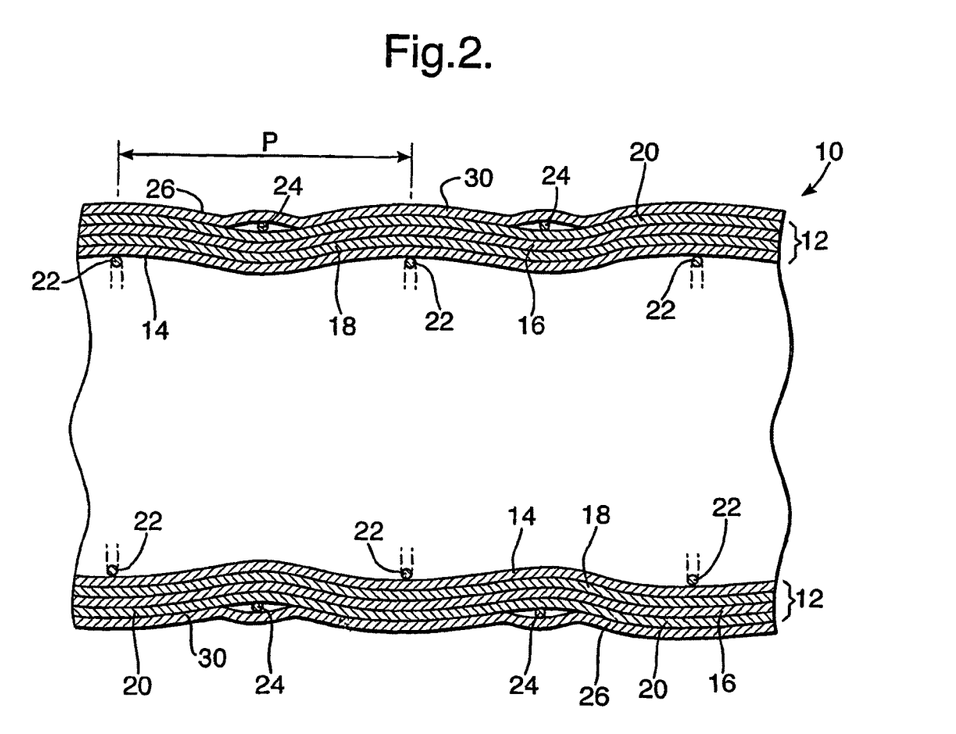
FIG. 2 is a cross-sectional view of an inner tubular structure of the hose shown in FIG. 1.

Referring first to FIGS. 1 and 2, a hose according to the invention is generally designated 100. The hose comprises an inner tubular structure 10 and an outer tube 30.

The inner tubular structure 10 comprises a tubular body 12 which comprises an inner reinforcing layer 14, an outer reinforcing layer 16, and a sealing layer 18 sandwiched between the layers 14 and 16. A generally tubular sheath 20, in the form of a braid, which provides axial strengthening, is disposed around the outer surface of the outer reinforcing layer 16.

The tubular body 12 and the tubular sheath 20 are disposed between gripping members in the form of an inner helically coiled wire 22 and an outer helically coiled wire 24. The inner and outer wires 22 and 24 are disposed so that they are offset from one another by a distance corresponding to half the pitch length of the helix of the coils.

An insulation layer 26 is disposed around the outer wire 24. The insulation layer 26 may be, for example, a conventional insulating material, such as a plastics foam.

The reinforcing layers 14 and 16 comprise woven fabrics of a synthetic material, such as UHMWPE or aramid fibres.

The sealing layer 18 comprises a plurality of layers of plastics film which are wrapped around the outer surface of the inner reinforcing layer 14 to provide a fluid tight seal between the inner and outer reinforcing layers 14 and 16.

An end fitting 28 is provided at each end of the inner tubular structure 10 and serves to terminate the tube 10. The end fitting 28 may be, for example, the type of end fitting described in WO01/96772 or WO 2004/079248.

The inner tubular structure 10 can be formed by: wrapping the inner wire 22 around a mandrel; wrapping the inner reinforcing layer 14 around the inner wire 22; wrapping the sealing layer 18 around the inner reinforcing layer 14; wrapping the outer reinforcing layer 16 around the sealing layer 16, pulling the tubular sheath over the outer reinforcing layer 16, wrapping the outer wire 24 around the sheath 20, and applying the insulation layer 26 over the outer wire 24 and the sheath 20.

The outer tube 30 comprises a rubber inner layer 32, first and second reinforcing layers 34 and 36, and an outer rubber cover 38. The layers 32, 34, 36 and 38 are covulcanised to form a structure in which all the layers are integrally bonded to the adjoining layers.

A hose nipple 40 is provided at the end of the outer tube 30 and serves to terminate the outer tube 30. The end fitting 28 and the hose nipple 40 may be connected together. Adjoining lengths of the hose 100 may be connected by securing the end fittings 28 of adjacent lengths of hose 100 and securing the hose nipples 40 of adjacent lengths of hose 100. However, it is preferred that adjoining lengths of the hose 100 are connected either: by securing the end fittings 28 of adjacent lengths of hose 100; or by securing the hose nipples 40 of adjacent lengths of hose 100. It should be noted that the ends of the hose inner tubular structure 10 are not necessarily co-terminus with the ends of the outer tube 40. There is an annulus 42 formed between the outer tube 30 and the inner tubular structure 10. The annulus may be left as free space, or may be partially or completely filled with an insulation material (not shown). When the annulus is left as free space, then spacers 44 may be provided to hold the inner tubular structure 10 in position relative to the outer tube 30. The spacers may be disc-shaped, with an inner circular aperture which receives the inner tubular structure 10.

The fluid to be transported can flow through the substantially cylindrical space 46 within the inner tubular structure 10.

Figure 3:
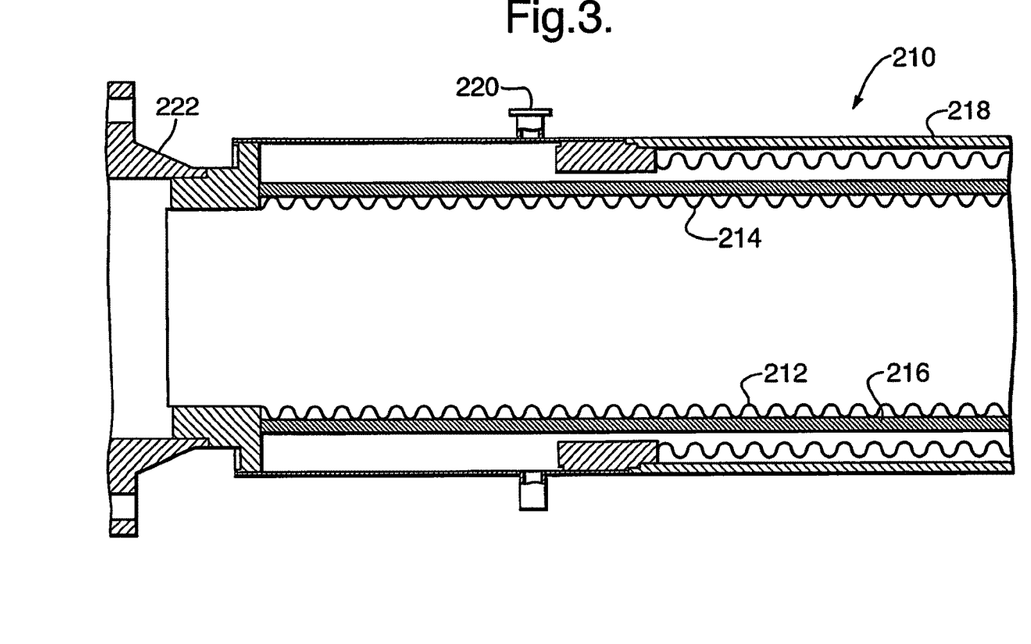
FIG. 3 is an alternative embodiment of an inner tubular structure of the hose shown in FIG. 1.

FIG. 3 shows an alternative embodiment of the inner tubular structure 10, which is designated 210. The inner tubular structure 210 comprises an inner tubular bellows 212 and an outer tubular bellows 214, each of which is provided with sinusoidal (or U-shaped or Ω shaped) corrugations. An insulation layer 216 is provided between the bellows 212 and 214. Furthermore, the space between the bellows 212 and 214 is placed in a vacuum, to further improve the insulation. An armoured layer 218 is provided around the outer bellows 214, to improve the insulation further. A pumping port 220 is provided for evacuating air from between the layers 212 and 214 in order to create the vacuum. The hose 210 also includes end fittings 222 at each end of the bellows hose (in FIG. 3, only one end fitting 222 is shown).

Figure 4:
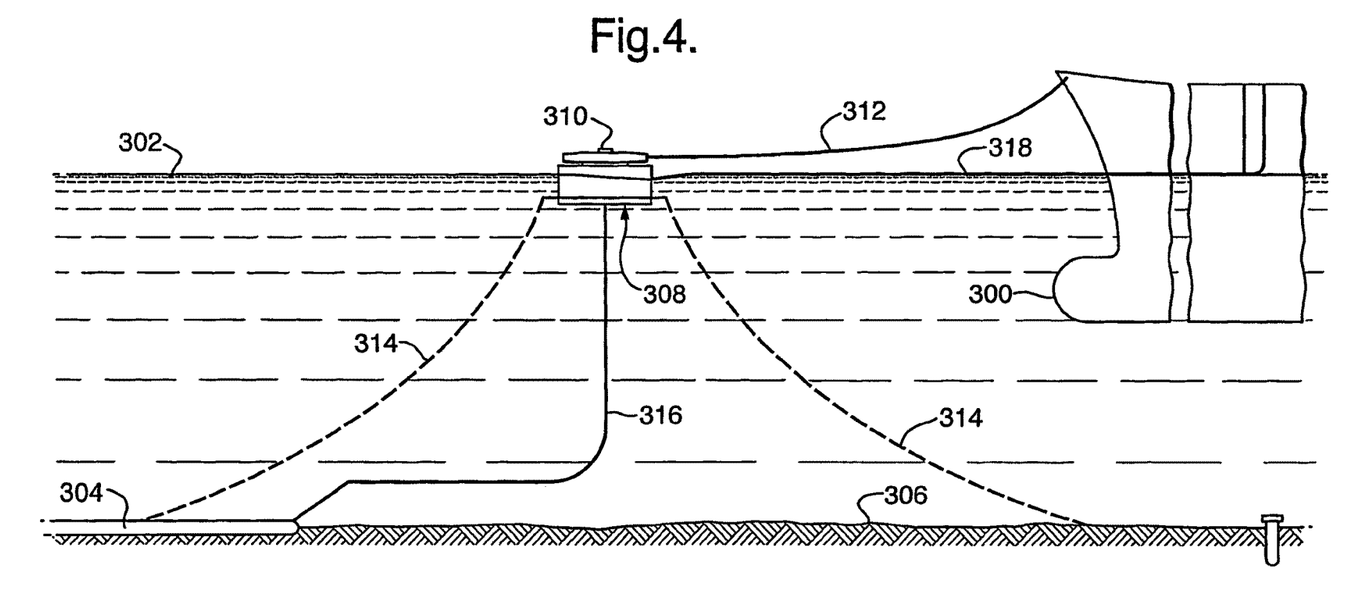
FIG. 4 is a schematic diagram illustrating a system according to the invention.

FIG. 4 is an illustration of an exemplary system utilising the hose 100 according to the invention. The system shown in FIG. 4 is a CALM system, but the hose 100 could equally well be applied in other systems, such as the SALM system, the CMBM system and the STM system.

In FIG. 4, a ship 300 containing an LNG storage unit (not shown) floats on the surface of the sea 302. A submarine pipeline 304 runs along the seabed 306. A surface mooring buoy 308 floats on the surface of the water, some distance from the ship 300. The buoy 308 includes a swivel connector 310 at the top thereof, which can swivel relative to the underlying part of the buoy 308. A mooring rope 312 extends from the ship 300 to the turntable 310, and anchor chains 314 extend from the base of the buoy 308 to the seabed 306.

A hose 316 extends from the ship 300 to the swivel connector 310. The hose 316 has a high buoyancy, so that it can float on the surface of the water. The hose 316 is constructed of the hose 100 described above, provided, if necessary, with additional layer(s) to improve the hose buoyancy.

A riser in the form of a hose 318 extends from the swivel connector 310 to the pipeline 304. The hose 318 is connected to the hose 316, whereby fluids can flow from the storage unit on the ship 302 to the pipeline 304 (or vice versa). The hose 318 is constructed of the hose 100 described above. If necessary, several lengths of the hose 100 can be joined together in order to reach from the buoy 308 to the ship 300, and/or from the buoy 308 to the pipeline 304.

The swivel connector 310 provides a fluid passageway which enables fluid to flow from the hose 316 to the hose 318 and vice versa. The swivel connector may have the structure shown in EP0833769.

It will be appreciated that the invention described above may be modified within the scope of the claims.

The invention claimed is:

1. A hose comprising an inner tubular structure and an outer tube, wherein the inner tubular structure comprises a tubular body disposed between inner and outer gripping members, the tubular body including a sealing layer sandwiched between at least two reinforcing layers, and being formed of a material capable of withstanding cryogenic temperatures, wherein the outer tube comprises a rubber layer and a reinforcing layer disposed around the rubber layer, and wherein the inner tubular structure has insulation properties sufficient to protect the outer tube from the low temperature of cryogenic fluid flowing within the inner tubular structure, wherein the inner tubular structure is movable relative to the outer tube during flexing of the hose.

2. A hose according to claim 1, wherein the inner tubular structure further includes an axial strengthening means.

3. A hose according to claim 2, wherein the axial strengthening means comprises a generally tubular braid formed of a sheet of material provided in a tubular shape.

4. A hose according to claim 3, wherein the axial strengthening means comprises a plurality of axial strengthening strips extending along the length of the hose.

5. A hose according to claim 2, wherein the axial strengthening means comprises a plurality of axial strengthening strips extending along the length of the hose.

6. A hose according claim 5, wherein the or each reinforcing layer is formed of a sheet of material which has been wound into a tubular form in the inner tubular structure.

7. A hose according to claim 5, wherein an insulation layer is incorporated in the inner tubular structure.

8. A hose according to claim 5, further comprising an end fitting disposed at each end of the inner tubular structure.

9. A hose according to claim 5, wherein the inner and outer gripping members of the inner tubular structure are helical gripping members.

10. A hose according to claim 5, wherein the inner and outer gripping members of the inner tubular structure are helical wires.

11. A hose according to claim 1, wherein each reinforcing layer sandwiching the sealing layer is formed of a sheet of material which has been wound into a tubular form in the inner tubular structure.

12. A hose according to claim 1, wherein the sealing layer is formed of a sheet of material which has been wound into a tubular form in the inner tubular structure.

13. A hose according to claim 1, wherein an insulation layer is incorporated in the inner tubular structure.

14. A hose according to claim 13, wherein the insulation layer is disposed between the inner and outer gripping members.

15. A hose according to claim 13, wherein the insulation layer overlies the outer gripping member.

16. A hose according to claim 15, wherein the insulation layer comprises an elongate member, made of an insulating material, having opposing longitudinal edges, the elongate member being helically wound around the tubular body such that the opposing longitudinal edges of the layer are in an adjacent or overlapping arrangement, wherein each longitudinal edge includes a formation capable of interengaging with a cooperating formation on the opposing longitudinal edge.

17. A hose according to claim 13, 14 or 15, wherein the insulation layer includes a fabric formed of basalt fibers.

18. A hose according to claim 1, further comprising an end fitting disposed at each end of the inner tubular structure.

19. A hose according to claim 1, wherein the inner and outer gripping members of the inner tubular structure are helical gripping members.

20. A hose according to claim 1, wherein the inner and outer gripping members of the inner tubular structure are helical wires.

21. A hose according to claim 1, wherein the components of the inner tubular structure are movable relative to one another during flexing of the hose.

22. A hose according to claim 1, wherein the inner tubular structure and the outer tube are dimensioned such that there is an annular space between the outer surface of the inner tubular structure and the inner surface of the outer tube.

23. A hose comprising an inner tubular structure, an outer tube and an insulation layer, wherein the inner tubular structure comprises a tubular bellows that comprises at least two reinforcing layers with a sealing layer sandwiched therebetween, wherein the outer tube comprises a rubber layer and a reinforcing layer disposed around the rubber layer, wherein the insulation layer is either incorporated in the inner tubular structure and/or is disposed between the inner tubular structure and the outer tube, wherein the inner tubular structure is movable relative to the outer tube during flexing of the hose, and wherein the inner tubular structure has insulation properties sufficient to protect the outer tube from the low temperature of cryogenic fluid flowing within the inner tubular structure.

24. A hose according to claim 23, wherein the inner tubular structure includes an end fitting at each end of the tubular bellows.

25. A hose according to claim 23 or 24, wherein the inner tubular structure includes a second tubular bellows arranged around the first bellows.

26. A hose according to claim 25, wherein an insulation layer is incorporated in the inner tubular structure.

27. A hose according to claim 26 wherein the insulation layer is provided between the two bellows.

28. A hose according to claim 25, wherein the reinforcing layer of the outer tube is a fabric layer or a metal layer, or a fabric incorporating metal parts.

29. A hose according to claim 25, wherein the reinforcing layer of the outer tube is a polymeric material which incorporates additional metallic reinforcement.

30. A hose according to claim 25, wherein the outer tube further includes a helical wire.

31. A hose according to claim 25, wherein the helical wire is embedded in a rubber matrix, or a matrix of another polymeric material.

32. A hose according to claim 25, wherein the outer tube further includes an outer cover layer.

33. A hose according to claim 25, wherein the layers of the outer tube have been subjected to curing after assembly, whereby all the layers are intimately bonded together to prevent the layers of the outer tuber from moving relative to one another.

34. A hose according to claim 25, wherein the inner tubular structure and the outer tube are dimensioned so that the outer surface of the inner tubular structure is in contact with the inner surface of the outer tube.

35. A hose according to claim 23 or 24, wherein an insulation layer is incorporated in the inner tubular structure.

36. A hose according to claim 23, wherein the inner rubber of the outer tube is a liner layer comprising a natural or synthetic rubber.

37. A hose according to claim 23, wherein the reinforcing layer of the outer tube is a fabric layer or a metal layer, or a fabric incorporating metal parts.

38. A hose according to claim 23, wherein the reinforcing layer of the outer tube is a polymeric material which incorporates additional metallic reinforcement.

39. A hose according to claim 23, wherein the outer tube further includes a helical wire.

40. A hose according to claim 23, wherein the helical wire is embedded in a rubber matrix, or a matrix of another polymeric material.

41. A hose according to claim 23, wherein the outer tube further includes an outer cover layer.

42. A hose according to claim 41, wherein the outer cover layer is rubber.

43. A hose according to claim 23, wherein the layers of the outer tube have been subjected to curing after assembly, whereby all the layers are intimately bonded together to prevent the layers of the outer tuber from moving relative to one another.

44. A hose according to claim 23, wherein the inner tubular structure and the outer tube are dimensioned so that the outer surface of the inner tubular structure is in contact with the inner surface of the outer tube.

45. A hose according to claim 23, wherein the inner tubular structure and the outer tube are dimensioned such that there is an annular space between the outer surface of the inner tubular structure and the inner surface of the outer tube.

46. A hose according to claim 45, wherein spacing means is provided within said annular gap in order to maintain a desired spacing between the inner tubular structure and the outer tube.

47. A hose according to claim 46, wherein said inner tubular structure further comprises an insulation material disposed in said annular gap.

48. A hose according to claim 23, wherein the inner diameter of the outer tube is at least 150 mm.

49. A hose according to claim 23, wherein the inner diameter of the inner tubular structure is at least 150 mm.

50. A system for transporting fluids from a surface offshore structure to a subsurface offshore structure comprising a riser operatively connected to the surface offshore structure and to the subsurface offshore structures in such a way that the fluid can flow from the subsurface offshore structure to the subsurface offshore structure or vice versa, wherein at least part of the riser is formed of a hose comprising an inner tubular structure and an outer tube, wherein the inner tubular structure comprises a tubular body disposed between inner and outer gripping members, the tubular body including a sealing layer sandwiched between at least two reinforcing layers, and being formed of a material capable of withstanding cryogenic temperatures, wherein the outer tube comprises a rubber layer and a reinforcing layer disposed around the rubber layer, and wherein the inner tubular structure has insulation properties sufficient to protect the outer tube from the low temperature of cryogenic fluid flowing within the inner tubular structure, wherein the inner tubular structure is movable relative to the outer tube during flexing of the hose.

51. A system according to claim 50, further comprising a buoy located at the surface, wherein the riser extends from the buoy to the subsurface offshore structure, and is supported by the buoy.

52. A system according to claim 50, wherein the riser extends directly from the surface offshore structure to the subsurface offshore structure.

53. A system according to claim 50, wherein a surface buoy is attached to a subsurface connector located at the seabed, and the hose extends directly from the surface offshore structure to the subsurface connector.

54. A system according to any one of claims 50 to 53, wherein the surface offshore structure is a ship or a floating platform.

55. A system according to claim 54, wherein the subsurface offshore structure is a submarine pipeline.

* * * * *

UNITED STATES PATENT AND TRADEMARK OFFICE
CERTIFICATE OF CORRECTION

PATENT NO. : 8,439,603 B2
APPLICATION NO. : 12/377261
DATED : May 14, 2013
INVENTOR(S) : Witz et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 837 days.

Signed and Sealed this
Eighth Day of September, 2015

Michelle K. Lee
*Director of the United States Patent and Trademark Office*